United States Patent [19]

Gram

[11] 4,284,188
[45] Aug. 18, 1981

[54] APPARATUS FOR PROCESSING ARTICLES COMPRISING ELEVATOR MEANS FOR CONVEYING CARPET-FORMED CARRIERS IN THE VERTICAL DIRECTION

[75] Inventor: Hans Gram, Vojens, Denmark

[73] Assignee: Brødrene Gram A/S, Vojens, Denmark

[21] Appl. No.: 922,214

[22] Filed: Jul. 5, 1978

[30] Foreign Application Priority Data

Jul. 14, 1977 [DK] Denmark .................... 3204/77

[51] Int. Cl.³ .............................................. B65G 37/00
[52] U.S. Cl. .................... 198/472; 198/795; 198/580
[58] Field of Search ............ 198/472, 580, 648, 795; 62/63, 380, 382

[56] References Cited

U.S. PATENT DOCUMENTS

| | | | |
|---|---|---|---|
| 3,418,084 | 12/1968 | Allington | 198/472 |
| 3,993,189 | 11/1976 | Khoylian et al. | 198/472 |
| 4,143,758 | 3/1979 | Gram | 198/795 |

FOREIGN PATENT DOCUMENTS 83428  2/1977  Australia ........................... 198/472

Primary Examiner—Joseph E. Valenza
Attorney, Agent, or Firm—Watson, Cole, Grindle & Watson

[57] ABSTRACT

An apparatus comprising elevator means for conveying carpet-formed flexible carriers in the vertical direction one about the other, an infeed station for inserting the carriers into the elevator means and an outlet station for removing the carriers from the elevator means, the carriers being mutually engageable at the outlet station and mutually disengageable at the infeed station and being controlled at the outlet station and at the inlet station by means of converging and diverging pairs of guideways which engage with sets of engagement means positioned at different levels at the front and trailing ends of each carrier.

1 Claim, 10 Drawing Figures

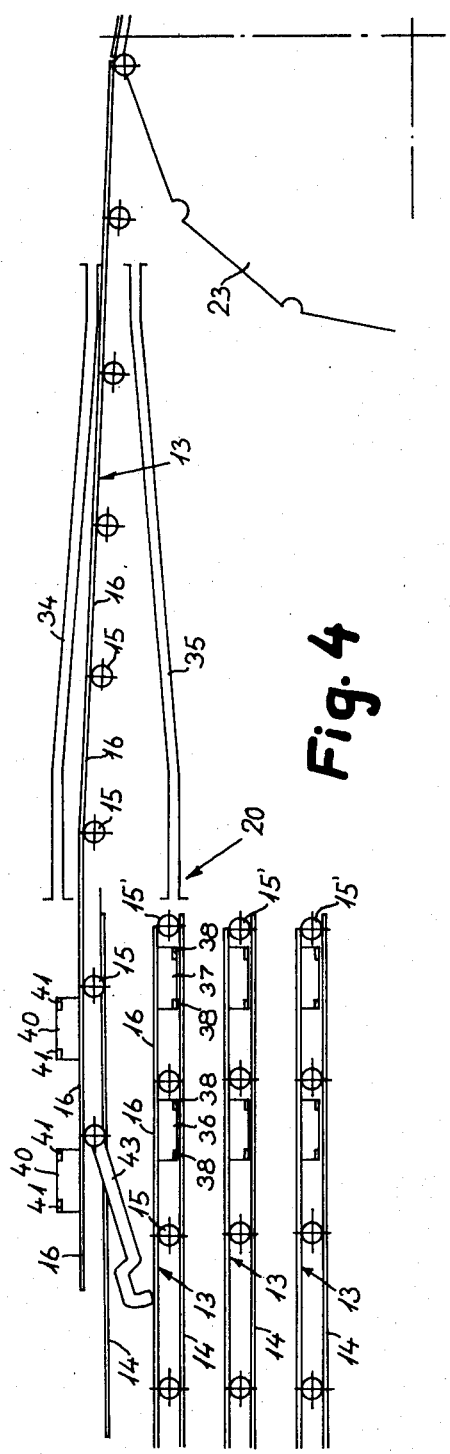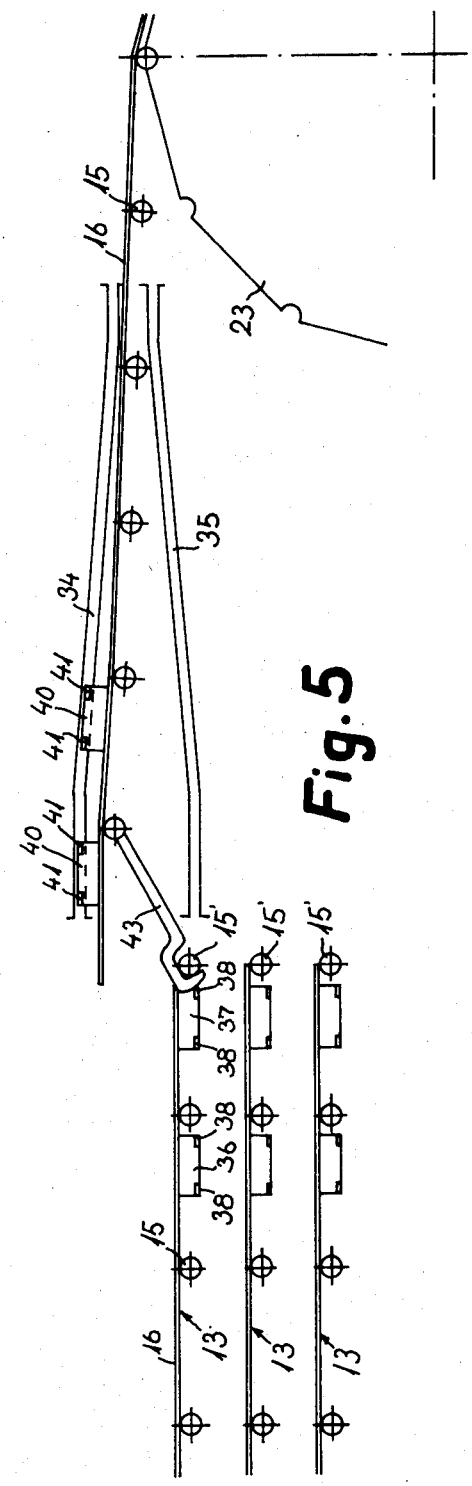

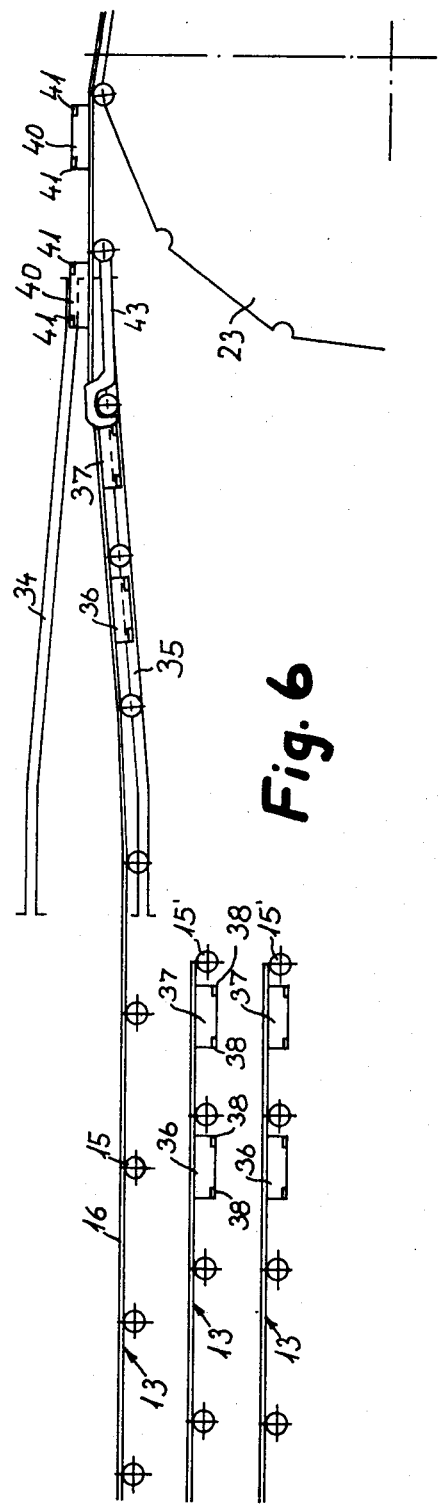
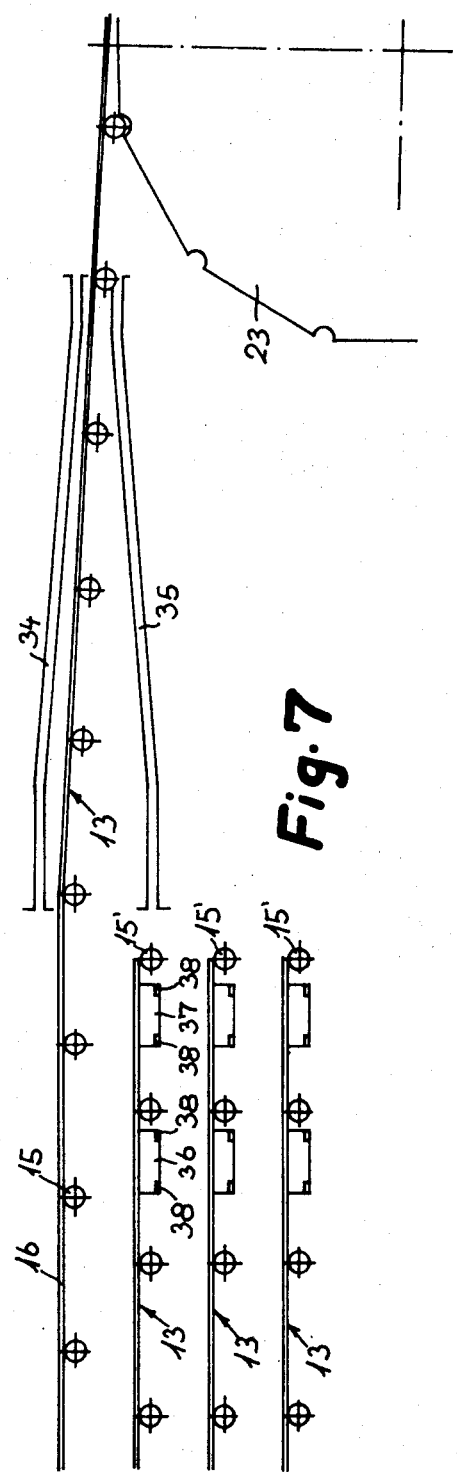

APPARATUS FOR PROCESSING ARTICLES COMPRISING ELEVATOR MEANS FOR CONVEYING CARPET-FORMED CARRIERS IN THE VERTICAL DIRECTION

BACKGROUND OF THE INVENTION

The present invention relates to an apparatus for processing articles, e.g. for cooling or freezing such articles or goods, the apparatus being of the kind comprising elevator means for conveying carpetformed, in the longitudinal direction flexible carriers in the vertical direction with a predetermined mutual distance above each other, wherein the elevator means are provided with an infeed station for inserting the carriers into the elevator means and an outlet station for removing the carriers from the elevator means, an wherein the apparatus moreover comprises means for conveying the carriers from the outlet station and to the infeed station.

An apparatus of the kind referred to above is known from U.S. Pat. No. 3,993,189. In order to feed the carriers into the elevator means the apparatus known from said U.S. specification comprises a pivotally supported ramp. When a carrier arrives at the infeed station, the front end of the carrier is moved onto the ramp and moved along the ramp onto a pair of supports of the elevator means which are moved in the vertical direction continuously. During this infeed movement the ramp pivots in such a way that one end of the ramp follows the pair of supports being loaded and, accordingly, the carrier to be fed into the elevator means will be supported by the ramp during the movement of infeed and, accordingly, the trailing end of the carrier will be fully supported. When the trailing end of a carrier has been inserted onto a pair of supports of the elevator means, the ramp is pivoted in the opposite direction corresponding to the mutual distance of two adjacent pairs of supports of the elevator means and now the front end of the following carrier can be inserted into the next pair of supports. Such ramp necessitates the use of means for pivoting the ramp up and down with two different velocities which complicates the apparatus.

SUMMARY OF THE INVENTION

The apparatus according to the present invention is characterized by a pair of guideways arranged at both sides of the infeed station and of the outlet station and by a set of transversely projecting engagement means arranged both at the front end and at the trailing end of each carrier for engaging the guideways and of which the engagement means at the front end of the carrier, in the horizontal position of the carrier in question, are positioned at another level than the level of the set of engagement means at the trailing end of the carrier in question, and by the guideways of each of the two pairs of guideways at the infeed station diverge in that their inlet ends have a level difference corresponding to the level difference of the two sets of engagement means of a carrier whereas said two guideways, at their outlet ends have a level difference corresponding to the level difference at their inlet ends plus the mututal distance between two pairs of supports of the elevator means, and, moreover, by the guideways of each of the two pairs of guideways arranged at the outlet station converge corresponding to the divergence of the pairs of guideways at the infeed station. By means of such construction a reliable guiding and control of the front and trailing ends of the carriers are achieved both during the infeed of the carriers into the elevator means and during the removal of the carriers from the elevator means and no movable parts are requested. This is due to the fact that the pairs of guideways arranged at the infeed station will guide the front end and the trailing end of a carrier into two different levels, the difference of which corresponds to the movement, in the vertical direction, carried out by the set of supports receiving the arriving carrier in question and, accordingly, both the front end and the trailing end of each carrier will be fully controlled and guided during the infeed movement. Exactly the same will apply as regards the removal of the carriers from the elevator means via the two pairs of guideways arranged at the outlet station.

According to a preferred embodiment of the apparatus according to the present invention the carriers may, at their trailing ends, be provided with a set of pivotable hooks for engagement with corresponding engagement openings at the front ends of the carriers, the hooks having a length which is longer than the maximum distance, in the vertical direction, between the two guideways of a pair of guideways. By means of such sets of hooks it is achieved that the carriers may be coupled into an almost unbroken conveyor band automatically when the carriers leave the elevator means and such conveyor band may be moved to the infeed station as a continuous carpet and, moveover, the hooks may be automatically disengaged when the carriers are to be separated from each other in order to be moved in the vertical direction by the elevator means.

Further advantageous features of the present invention become more apparent from the following description of a preferred embodiment of the apparatus

DESCRIPTION OF THE PREFERRED EMBODIMENT

Figure 1A:
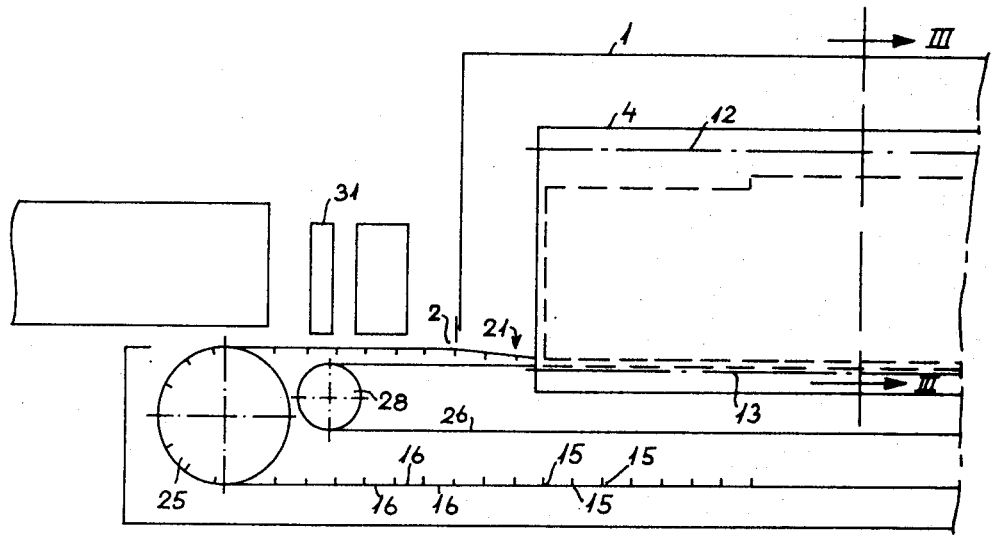
FIGS. 1A and 1B show an embodiment of the apparatus according to the present invention in side view and partially in section, FIGS. 2A and 2B the apparatus shown in FIGS. 1A and 1B in side view and partially in section, wherein however the section is positioned in another plane of section than in FIGS. 1A and 1B, FIG. 3 a vertical cross section of the apparatus illustrated in FIG. 1A taken along the section line 111—111, FIGS. 4, 5, 6 and 7 views for illustrating different steps during removal of carriers from elevator means of the apparatus, and FIG. 8 a view illustrating a single step during infeed of carriers into the elevator means of the apparatus illustrated.
Figure 1B:
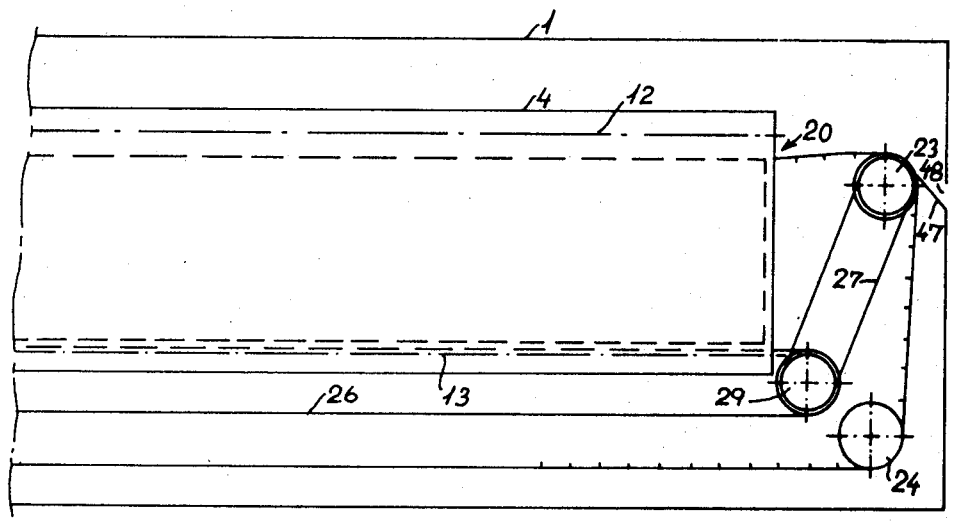
Figure 2A:
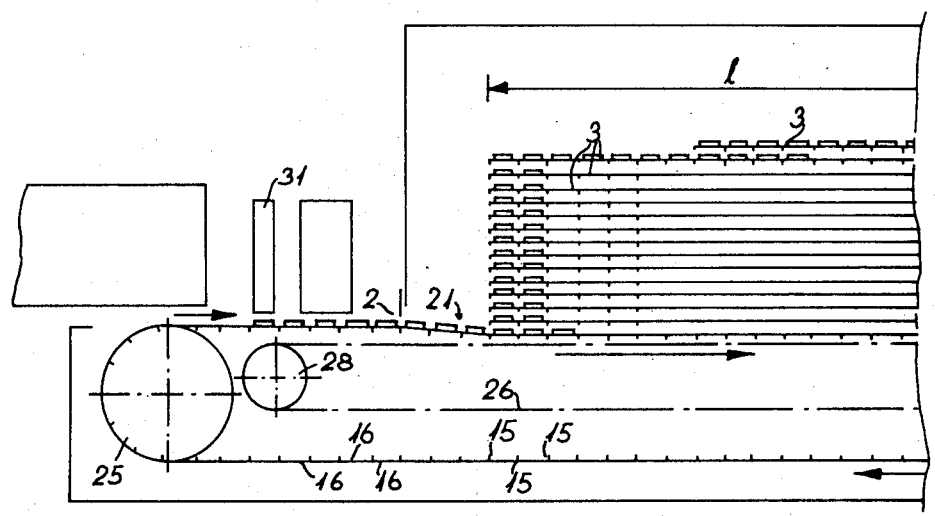
Figure 2B:
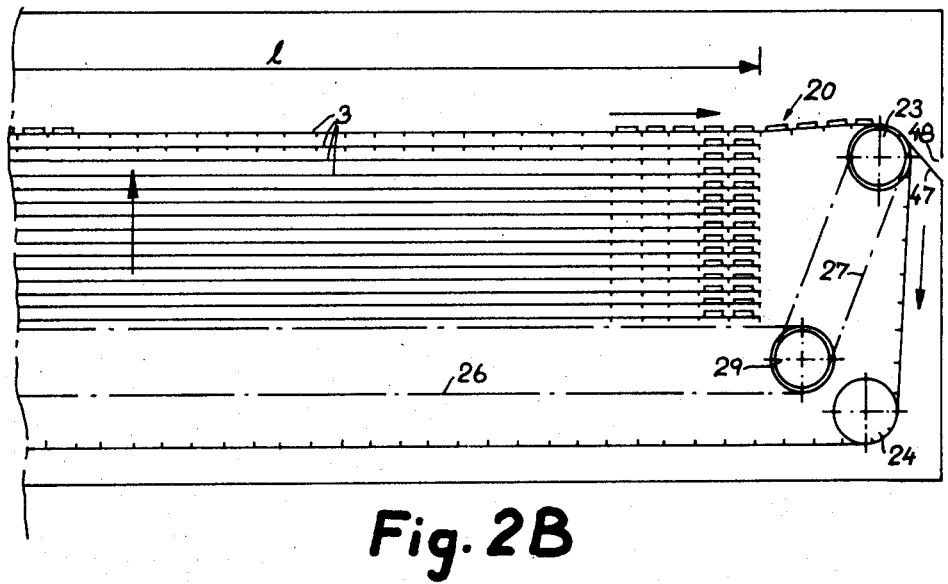

On the drawing, 1 is a housing which at one of its ends comprises an infeed opening 2 for feeding carriers 3, FIG. 2, into the housing. The housing contains elevator means which in general are designated 4 in FIG. 1, but are clearly illustrated in FIG. 3. The elevator means comprise two oppositely arranged vertical endless conveyors 5,5 extending around conveyor rollers 6,7 and 8,9, respectively, which rotate about axes 10,11,12 and 13, respectively, of which two axes 12 and 13 are indicated in FIG. 1 by dotted lines. The two conveyors comprise supports 14 which are distributed evenly along the conveyors 5,5 and which extend in the horizontal direction. The conveyors 5,5 can be driven continuously by driving means (not shown), and from FIG.

Figure 3:
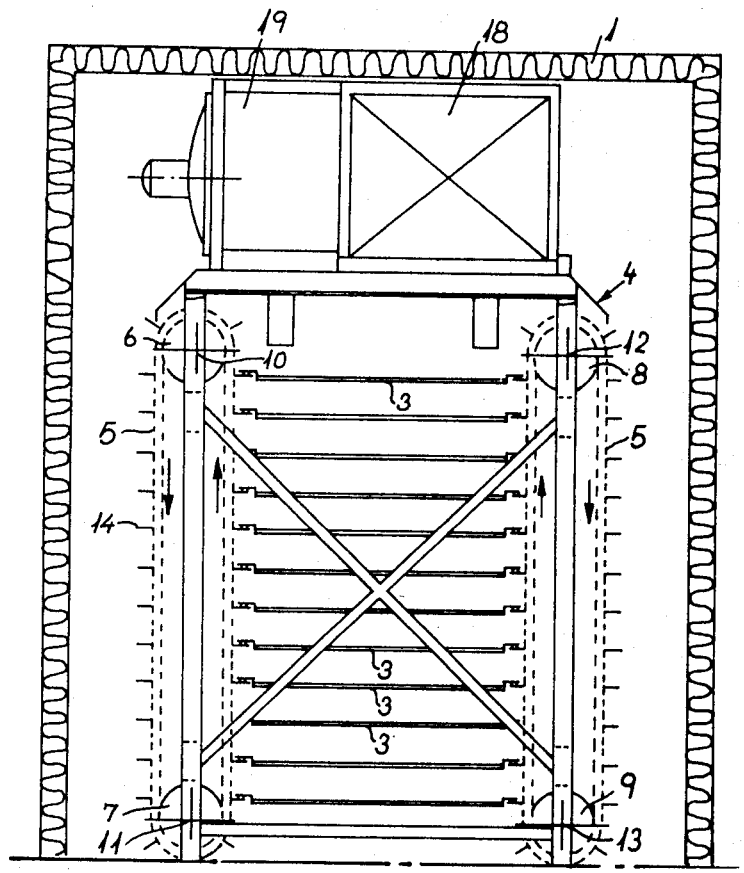

3 it will be will be apparent that, when the conveyors are driven in the directions indicated by means of arrows in FIG. 3, the supports 14 will move upwardly in pairs opposite to each other. The supports 14 facing each other serve to support carriers 3 which, accordingly, during their movement by the elevator means are moved above each other at a definite mutual spacing or pitch corresponding to the pitch of the supports 14.

All the carriers 3 are of the same length, of. The distance l as indicated in FIG. 2 and are constructed of lamellae which extend in the direction perpendicular to the dimension l. The lamellae are mutually hinged in such a way that the carriers are flexible in their longitudinal direction. Such hinges are in FIG. 6 indicated by the references 15 and the lamellae extending between the hinges are indicated by 16. The lamellae 16 may e.g. consist of sheet material, but it is preferred to construct the lamellae of mesh material, or other material which is airpervious, because the embodiment of the apparatus according to the invention illutrated on the drawing is constructed for cooling or freezing of articles or goods supported by the carriers and, accordingly, the housing 1 contains, as it appers from FIG. 3, an evaporator 18 arranged above the elevator means and a fan 19 in such a way that cold air can be circulated between and through the carriers 3 during their upward movement caused by the elevator means.

The apparatus also comprises conveyor means for moving the carriers from an outlet station (at 20) from the elevator means 4 and to the infeed opening 2 and from this opening to an infeed station (at 21) to the elevator means 4. These conveyor means comprise three guiding rollers 23,24 and 25 for the carriers 3 and two chain drives 26 and 27 of which the chain drive 26 is driven by means of a set of driven sprockets 28. The chain drive 26 drives a set of sprockets 29 which, by means of the chain drive 27, drives the roller 23. Moreover, the chain drive 26 serves to feed carriers into the elevator means 4 as will be explained in more detail in the following. The directions in wich the chain drives are driven are indicated by arrows in FIG. 2.

The apparatus comprises moreover a loading station for articles or goods to be processed in the apparatus, as indicated at 31 in FIG. 2. This station is arranged before the infeed opening 2 in the housing 1 as seen in the direction of movement of the carriers. According to the embodiment illustrated on the drawings, the loading station 31 is intended to position a row of articles upon each lamella 16, but it will be understood that also any other sort of loading of goods or articles may be used.

The apparatus, to the extent explained above, operates in the following way:

When a carrier 3 arrives at the top of the elevator means 4, the front end of the carrier in question is moved outwards and is moved around the roller 23 due to the driving movement from the chain drive 27 an, accordingly, the carrier moved in direction towards the roller 24 and further towards the roller 25. When the trailing end of the carrier being removed is just about to leave the elevator means 4, the elevator means have, in the meantime, moved the following carrier upwards, viz. corresponding to one pitch of the supports 14 and the trailing end of the carrier now at the top of the elevator means 4. The withdrawal of carriers is continued in this way, viz. so that, by each movement of the elevator means 4 corresponding to one pitch of the supports 14, a carrier is withdrawn, the trailing end of which is being engaged with the front end of the next carrier. Accordingly, a generally continuous band or carpet is formed which, accordingly, moves around the rollers 23, 24 and 25 and between the latter roller 25 and the infeed opening 2. Such band or carpet is appropriate for being loaded with articles of goods.

At the infeed station 21 the carriers must be mutually disengaged because the front end of each arriving carrier is to be inserted into a compartment or bay formed by two, opposite each other arranged, supports 14 of the elevator means 4, viz. the compartment or bay which at such arrival is positioned at the bottom of the elevator means 4. When the carrier in question has been inserted into the corresponding compartment or bay, such compartment or bay will have been moved one pitch in the upward direction and the front end of the following carrier is then to be inserted in the compartment or bay which is now positioned at the bottom of the elevator means.

From the above explanation it will be understood that, during insertion and removal of carriers into and from the elevator means 4, that part of the carrier in question which is positioned in the elevator means 4, will be moved in the vertical direction, whereas that part which is to be inserted or that part which has been removed will be positioned at a constant level because a carrier, which is being removed, now has to pass the upper part of the roller 23 and a carrier, which is being inserted, has to pass the upper portion of the roller 25. Furthermore, along the loading station 31 supports (not illustrated on the drawing) for the carriers are arranged because the carriers should not sag at this position. Due to the fact that the carriers are flexible in their longitudinal direction, ad previously explained, it will be understood, that the trailing end of a carrier, which is about to be inserted into the elevator mean 4, could fall downwardly before having passed the infeed station 21 unless appropriate supporting means are positioned at the infeed station 21. Moreover, the trailing end of a carrier being withdrawn, could fall down between the outlet station 20 and the roller 23 if suitable supporting means were not arranged at this position.

Figure 8:
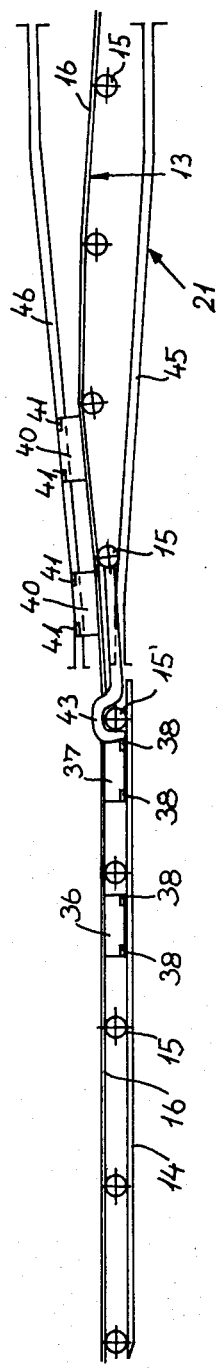

However, the apparatus according to the invention is provided with such supporting means and they are, as regards the outlet station, illustrated in FIGS. 4–7 and they are, as regards the infeed station, illustrated in FIG. 8.

The supporting means at the outlet station 20 consist of two pairs of guideways arranged opposite each other in the horizontal direction. Due to the fact that FIGS. 4–7 illustrate sectional views, only one pair of guideways 34,35 is visible in these figures. These pairs of guideways serve to control and guide the front end and the trailing end of a carrier during the withdrawal of the carrier. In order to achieve this object the two foremost lamellae 16 of each carrier are, at both at their ends, provided with a guiding block 36 and 37, respectively, and each of the guiding block supports two laterally projecting engagement means 38 for engagement with the lower guideway 35 of the pair of guideways illustrated. The two rearmost lamellae of each carrier, cf. top of FIG. 4, also support a guiding block 40,40 at each end, each provided with two laterally projecting engagement means 41 for engaging the uppermost guideway 34. As it appears from FIG. 4, the blocks at the front end of a carrier are arranged on the lower surface of the carrier, whereas the blocks at the trailing end are arranged on the upper surface of the carrier. Accordingly, in horizontal position of the carrier in question, the engagement means 38,41 of such carrier will be positioned at different levels. This level difference supplemented with the position of the elevator means 4, viz. supplemented with the distance between two adjacent sets og supports 14, corresponds to the distance in the vertical direction between the guideways 34 and 35 at the inlet ends thereof, which in FIG. 4 are the left hand ends of the two guideways. The velocity with which the carriers are withdrawn from the elevator means is selected in such a way that the withdrawal of a carrier takes exaxctly as long time as the movement of the supports 14 one pitch by the elevator means. Moreover, the movement of the elevator means is synchronized in such a way that the set of engagement means 38 at the front end of a carrier is positioned exactly opposite the inlet ends of the lowermost guideways when the withdrawal of the beforegoing carrier has been terminated. In FIG. 4 the stage immediately before the termination of the withdrawal of the uppermost carrier is illustrated, and from FIG. 4 it will be seen that the carrier second from the top is positioned approximately opposite the inlet end of the guideway 35. During the withdrawal of a carrier the trailing end of the carrier will be moved one pitch upwards and due to the level arrangement explained above, as regards the inlet ends of the guideways 34 and 35 and of the sets of engagement means at the front end and the trailing end of the carrier, the set of engagement means at the trailing end of the carrier being withdrawn will, at the termination of such withdrawal, be positioned exactly opposite the inlet end of the guideway 34.

The final stage of the withdrawal of a carrier is illustrated in FIG. 5, from which it will be seen that the trailing end of the carrier which has been withdrawn is now guided and controlled by means of the uppermost guideway 34, and the front end of the carrier now at the top of the elevator means is positioned with its engagement means 38 opposite the inlet end of the lowermost guideway 35. Accordingly, the two rearmost lamellae of the carrier which has been withdrawn, are now guided in the guideway 34 due to the engagement means 41.

At the trailing end of each carrier a set of hooks is pivotally supported. One of the hooks 43 is illustrated in FIGS. 46. The hooks are pivotally supported by means of the hinges of the rearmost lamella of the carriers and the length of the hooks 43 corresponds to the pitch of the lamellae, viz. to the width of the lamellae or the distance between the hinges 15 of the lamellae. With the expression "the length of the hooks" the distance between their centre of rotation and the centre of their hookformed part is to be understood. According to the embodiment illustrated on the drawing, the carriers form, along their longitudinaly extending side edges, unbroken slide ways for the hooks. However, adjacent the front end an opening is provided in each of the slide ways of the carriers and through these openings the hooks may engage a transversely extending pin 15' having the same diameter as the hinges 15 and arranged at the front edge of the foremost lamella.

Such engagement is illustrated in FIG. 5, from which it will be seen that the hooks of the carriers, which has just been withdrawn, have engaged the front end of the carrier still positioned in the elevator means and due to such engagement, the front end of the following carrier will be drawn into the inlet end of the guideway 35, whereby the withdrawal of the following carrier will be initiated as illustrated in FIG. 6, and simultaneously the rear end of the carrier, which has been withdrawn, has been permanently engaged with the front end of the following carrier. Accordingly, no separate means of transportation are necessary for the withdrawal because the movement of withdrawal is diverged from the driven roller 23. The two guideways 34 and 35 converge in the direction of withdrawal, viz. in such a way that the outlet ends of the two guideways have a mutual distant corresponding to the difference in the levels of the sets of engagement means at the front and trailing ends of the carriers. Accordingly, the trailing end of a carrier being withdrawn will be moved downwards and the front end of a carrier being withdrawn will be moved upwards in such a way that the carriers will be positioned at the same level and flush with each other when they leave the guideways 34 and 35 as illustrated in FIG. 6. That part of each carrier which is positioned between the front end and the rear end of the carrier will not be guided by means of the guideways during the withdrawal, but such guiding is not necessary because the withdrawn end will be guided in a reliable way by means of the roller 23 whichis provided with recesses for engaging the hinges 15. Moreover, the trailing end of a carrier being withdrawn will still be supported by the supports 14 of the elevator means in such a way that the part of the carrier which extends between the roller 23 and the supports 14 will be under tension and, accordingly, will have no pronounced tendency to sag.

After the detailed explanation given above as regards the outlet station, the relationships at the infeed station 21 will easily be understood with reference to FIG. 7. As explained above the carriers arrive at the infeed station 21 via the infeed opening coupled after ach other and after having been loaded with articles or goods at the loading station 31. The two pairs of guideways arranged at the infeed station are constructedcorresponding to the two pairs of guideways at the outlet station. In other words, the level differences at the broad end and at the narrow end of the pairs of guideways are the same at the infeed station as at the outlet station. The only difference is that the two guideways of each pair of guideways diverge at the infeed station whereas they converge at the outlet station.

The carriers arrive at the infeed station supported by stationary supports, and due to the fact that these supports are arranged in such a way that the engagement means 38 at the front end of a carrier are moved at the same level as the inlet end of the lowermost guideway 45, the front ends of the carriers will be guided into this guideway and, when the trailing end of a carrier reaches the inlet end of the uppermost guideway 46, the engagement means 41 at the trailing end of the carrier will be guided into the guideway 46. Accordingly, the front end of a carrier will be moved downwards and the trailing end will be moved upwards and exactly in such a way that the front end reaches the corresponding compartment or bay in the elevator means when the compartment or bay in question is positioned opposite the outlet end of the guideway 45. Moreover, this compartment or bay will have been moved such a distance upwards that the elevated trailing end of the carrier will be positioned at the same level as the compartment or bay, when the trailing end reaches the inlet of the compartment or bay.

From the drawing it will be seen that the hooks 43 have such a length that they are able to reach from one of the guideways of each pair of guideways to the other, at a position where the distance between the two guideways is at its maximum, as it clearly appears from FIG. 5. Accordingly, it is possible for a preceding carrier to move the following carrier into the corresponding guideway at the outlet station. Exactly the same is the case at the infeed station 21, FIG. 8, but at the infeed station the preceding carrier is prevented from drawing the following carrier into the elevator means 4 due to the fact that the trailing end of a carrier stops moving at the termination of the infeed operation. In order to draw the carriers into the elevator means 4, the chain drive 26 is provided with pushing members which in a way not illustrated on the drawing, catch the front end of a carrier when the front end of such carrier has been inserted into the lowermost guideways 45 of the pairs of guideways at the infeed station and, accordingly, the chain drive 26 takes over the movement of the carrier in question and draws it into its final position in the elevator means 4, cf. FIG. 2. Before the chain drive 26 may take over the movement of the carrier to be inserted, the engagement between the front end of the carrier in question and the trailing end of the preceding carrier must be released by releasing the hooks 43 which, however, is easily done due to the forced guiding of the two ends of the carriers by means of the two guideways 45,46. Such disengagement of the hooks can be caused by an appropriate cam arranged between the guideways 45 and 46 and against which the hooks are moved so as to be lifted when the front end of the following carrier has been drawn into the corresponding guideways and have been caught by the pushing members of the chain drive 26.

Due to the fact that the length of the hooks 43, as explained above, corresponds exactly to the width of a lamella 26 and due to the fact that the hooks are hinged one pitch from te trailing end of the rearmost lamella and, moreover, due to the fact that the engagement pins 15' for the hooks are arranged with the axes thereof coaxially with the front edge of the foremost lamella, it will be understood that two carriers, by means of the hooks, will be connected with each other with a minimum of gap between the rearmost edge of a preceding carrier and the front edge of the following carrier in such a way that the carriers, when coupled together, form an almost unbroken band or carpet. This facilitates an exact positioning of the articles or goods upon the carriers due to the fact that the pitch of the lamellae continues unchanged beyond the couplings between the carriers.

However, it will be understood that such unbroken mutual engagement may also be achieved without fulfilling all the conditions stated above as regards the length of the hooks and the positioning of the corresponding engagement means for the hooks. The only condition which must be fulfilled is that the length of the hooks corresponds to the sum of the distance between the pivots of the hooks and the rear ends of the carriers and the distance between the engagement means for the hooks and the front edges of the carriers. According to the embodiment of the apparatus according to the invention illustrated on the drawing, the latter distance is nil as it will be understood from the above datiled specification.

In order to illustrate the present invention an embodiment has been selected according to which the elevator means move the carriers in the upward direction. However, it will easily be understood that the present invention is not limited to such movement, but may also be realized in connection with elevator means which move the carriers in downward direction and in connection with apparatuses wherein the carriers are moved both in the up and in the downward directions, e.g. by means of two sets of elevator means.

According to the embodiment illustrated on the drawing, the goods or articles treated in the apparatus are removed by means of a chute 47, cf. FIGS. 1 and 2, the uppermost edge of which is arranged in such a way that it forms a tangent to the carriers while the carriers pass the roller 23 and in such a way that the chute may scrape off the articles carried by the carriers after which the articles via the chute 47 is conducted outwards through an opening 48 in the housing. However, it will be understood that also other sorts of removal devices for removing the articles treated may be used. For instance, noting prevents a positioning of the roller 23 outside the housing 1 in such a way that a removal station is formed outside the housing at which the carriers are moved in the horizontal direction.

I claim:

1. A conveying apparatus for continuously conveying articles through a processing environment, said apparatus comprising elevator means having vertically spaced supports continuously movable in the vertical direction, carpet-formed article carriers which are flexible in their longitudinal direction, said carriers being supportable on said supports, insert means for successively inserting said carriers on said supports at an insert position of said elevator means, withdrawal means for successively withdrawing said carriers from said supports at a withdrawal position of said elevator means, and means for conveying said carriers in a path from said withdrawal position back to said insert position, characterized in that said insert means comprise two pairs of insert slot guides arranged on either side of the path of the carriers, said slot guides having guiding slots open in the direction towards the path of said carriers, each of said carriers having a first set of transversely projecting engagement means at its leading end for positive engagement with the guiding slots of one of the insert slot guides of said pair, and a second set of transversely projecting engagement means for positive engagement with the guiding slot of the other one of the insert slot guides of each pair, said second set of engagement means being located, in the horizontal position of a carrier, at a level different from the level of said first set of engagement means, the inlet ends of the guiding slots of each pair of insert slot guides having a level difference equal to the level difference of said first and second engagement means, the outlet ends of the guiding slots of each pair of insert slot guides having a level difference equal to the level difference of the inlet ends plus the level difference of successive supports of said elevator means, the guiding slots thereby diverging in the direction of travel of said carriers, said withdrawal means comprising two pairs of withdrawal slot guides which are constructed inversely to said insert slot guides and thus having guiding slots converging in the direction of travel of said carriers, said carriers being provided at their leading and trailing ends with intercoupling means which are disengageable from carrier to carrier in response to the level difference between the trailing end of a carrier and the leading end of the next following carrier caused by the engagement of the engagement means at said ends in the guiding slots of one and the other respectively of each pair on insert slot guides, and are engageable by the levelling of said ends similarly caused by said withdrawal slot guides, the carriers thereby being intercoupled to form a belt capable of travelling as an independent entity from said withdrawal position to said insert position.

* * * * *